April 4, 1961     J. E. PRITCHARD     2,978,362

WATER-REPELLENT FABRIC

Filed March 11, 1957

FABRIC WITH ONE SIDE COATED WITH
CHLORINATED POLYETHYLENE.

TEXTILE MATERIAL IMPREGNATED
WITH CHLORINATED POLYETHYLENE
WHICH BEFORE CHLORINATION HAD A
DENSITY OF AT LEAST 0.95 AND A
CRYSTALLINITY AT 25° C OF AT LEAST
90 PER CENT.

*INVENTOR.*
J.E. PRITCHARD

BY *Hudson & Young*

*ATTORNEYS*

United States Patent Office 2,978,362
Patented Apr. 4, 1961

2,978,362
WATER-REPELLENT FABRIC

James E. Pritchard, Bartlesville, Okla., assignor to Phillips Petroleum Company, a corporation of Delaware Filed Mar. 11, 1957, Ser. No. 645,025

5 Claims. (Cl. 117—135.5)

This invention relates to an improved water repellent fabric. In another aspect this invention relates to a method of imparting to a fabric water repellency which will not deteriorate on exposure to hydrocarbon solvents.

Coating fabrics with various waxes, resins and the like to render said fabrics repellent to water is well known in the art. Such a practice is commonly used in the manufacture of tents, tarpaulins, awning material and various articles of wearing apparel. Halogenated hydrocarbon polymers employed for this purpose have exhibited susceptibility to deterioration on exposure to various hydrocarbon solvents and solvent vapors such as a cyclohexane, benzene, toluene, and the like. It has been a common fault of water repellent jackets and top-coats to lose their water repellency while being dry cleaned. Tarpaulins and awnings employed in industrial locations where there is continual exposure to either liquid or vaporized hydrocarbon solvents tend to lose their water repellency and must be retreated periodically.

I have found that fabrics coated or impregnated with a halogenated, highly crystalline monoolefin polymer exhibit excellent water repellency which is retained even after exposure to various hydrocarbon solvents at atmospheric conditions of temperature and pressure. Highly crystalline polymers of monoolefins having two to eight carbon atoms and no branching nearer the double-bond than the four position when halogenated in solution with chlorine, bromine or iodine and applied to fabric enable complete retention of water repellency when exposed to hydrocarbon solvents.

Figure 1:
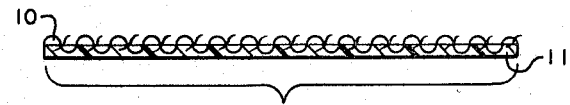
Figure 2:
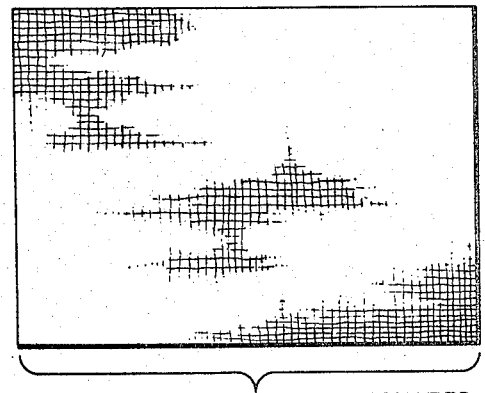

It is an object of this invention to provide an improved water repellent fabric. It is another object of this invention to provide a method of imparting to a fabric water repellency which is retained even upon exposure to various hydrocarbon solvents at atmospheric conditions. Still another object of this invention is to impart water repellency to a fabric with an agent which has improved processability, physical properties and resistance to solvent deterioration. Other objects, advantages and features of my invention will become apparent to those skilled in the art from the following description and appendant claims and drawing in which Figure 1 shows a schematic sectional view of a coated fabric and Figure 2 represents an impregnated textile material.

The superior product of my invention is made by coating or impregnating a fabric such as duck, muslin, canvas or the like with a halogenated, highly-crystalline polymer of monoolefin materials such as ethylene, propylene, and butene. Recent developments in the art of olefin polymerization have enabled the production of such polymers which are more linear and have a higher degree of crystallinity than olefin polymers previously available from processes employing extremely high temperatures and pressures.

The polyolefin which I prefer to halogenate for the practice of my invention is an ethylene polymer having a density of at least 0.93, a crystallinity at 25° C. as determined by nuclear magnetic resonance of at least about 75 percent, and a relatively high softening temperature of 235° F. and above. The ethylene homopolymer is preferred but polymers from monomer systems containing up to 30 weight percent comonomers such as propylene, 1-butene or 2-butene are also suitable. When employing the copolymers of ethylene with the higher molecular weight monomers mentioned above, it is preferred, in order to maintain the degree of crystallinity, density and softening temperature as high as possible, to limit the amount of comonomer in the monomer system to about 15 weight percent. Copolymers of this type are characterized by a density of at least about 0.94, a crystallinity at 25° C. of at least 80 percent and a softening temperature of at least 240° F. If the amount of comonomer in the polymer is lowered, these properties tend to improve and the homopolymer of ethylene, which is preferred for my invention, has a density of at least 0.95, crystallinity at 25° C. of at least 90 percent and a softening temperature above 250° F.

"Softening temperature" as applied to these thermoplastic polymers and used in this specification can be defined in terms of the softness of the polymers. "Softness" of a polymer is a measure of its relative deformation under a standard load for a certain time interval at a particular temperature. The method for determining softness as used in this specification is that described by the article of Karrer, Davis and Dieterich in Industrial and Engineering Chemistry (analytical edition), 2, 96 (1930). The softening temperature for a polymer is determined by plotting softness over a range of temperatures with temperature on the abscissa. As softness increases with temperature, the slope of the curve formed by the plot likewise increases, and the temperature at which the slope of the curve equals the tangent of 60° is, by definition, the softening temperature.

To produce the olefin polymers having the desired properties for my invention, I prefer to polymerize ethylene with or without comonomers in the presence of a catalyst comprising chromium, a portion of which is hexavalent (preferably at least 0.1 percent by weight of the total catalyst), as chromium oxide associated with at least one oxide from the group consisting of silica, alumina, zirconia and thoria. The total chromium content of the catalyst is preferably between 0.1 and 10 weight percent.

In this process the polymerization is ordinarily carried out at a temperature between 150 and 450° F. and the pressure of the reaction can vary over a wide range, for example from atmospheric pressure to 1000 pounds per square inch absolute or higher. Generally, however, this reaction is known as a low pressure polymerization, in contrast to the high pressure processes currently practiced for the production of branched-chain polyethylene. The reaction can be carried out in a gaseous phase but when a diluent is used, the minimum pressure is that necessary to maintain the diluent in a liquid phase. Preferred diluents are solvents which are liquid, nondeleterious and inert under contacting conditions, such as hydrocarbon solvents, especially naphthenic hydrocarbons and paraffinic hydrocarbons having from three to twelve carbon atoms, for example, propane, isooctane, cyclohexane, normal pentane, isopentane and methylcyclohexane. In such cases the reaction pressure is ordinarily in the range of about 100 to 800 pounds per square inch absolute.

The product of this reaction is generally a mixture of polymer, solvent and catalyst when slurry or suspended catalyst is used. The solvent is removed and the catalyst can be separated from the polymer or allowed to remain therein depending upon the final purpose for which the polymer is used. The preparation of such polyolefins is more fully described in the copending application of Hogan and Banks, Serial No. 573,877, filed on March 26, 1956, now U.S. Patent 2,825,721.

While the above described process is the preferred manner for preparing the olefin polymers to be halogenated for use in my invention, any process which will yield an ethylene polymer or copolymer having the required physical characteristics is satisfactory. For example, another suitable method is a low pressure process in which the polymerization is effected in the presence of catalyst systems which preferably comprise an organometal derivative as one component. Such catalyst compositions can have two or more components, one component being an organometal compound, metal hydride or a group I, II or III metal and the other component being a compound of a group IV to VI metal. With certain of the above two component systems an organic halide having 30 or less carbon atoms per molecule or a metal halide can be advantageously used as a third catalyst component. Specific example of suitable catalyst systems are triethylaluminum and titanium tetrachloride, mixtures of ethyl aluminum halides and titanium tetrachloride, titanium tetrachloride and sodium or magnesium, and titanium tetrachloride with lithium aluminum hydride and ethyl bromide.

The halogenation process to form the treating material for my invention can be carried out by dissolving a polymer of the type above described in a suitable solvent and contacting the resulting solution with a free halogen, chlorine being preferred. Such a chlorination can be carried out in a single step or in two stages in which steps one and two have different conditions of temperature and pressure or different solvents for the chlorinated product. For example, the polymer can first be dissolved in a solvent such as tetrachloroethane, chlorobenzene, or dichlorobenzene, and the halogenating agent, for example, chlorine, then introduced until a product containing at least thirteen weight percent combined chlorine is obtained. The temperature at this stage of the chlorination is at least sufficient to cause all the polymer to dissolve in the solvent and can suitably range from about the melting point of the polymer (for polyethylene, at least 113° C.) to the refluxing temperature of the solvent so long as no degradation of the polymer occurs. It is preferred to operate at a temperature which does not exceed about 130° C. The mixture is agitated during chlorination and when the polymer chlorine content reaches about 13 to 20 percent, the mixture is cooled and a lower boiling solvent, such as carbon tetrachloride or similar material, is added. The chlorination is then continued until a product having the desired chlorine content is provided. Agitation should be continued and the reaction temperature of the second step is from about 25° C. to the reflux temperature of the solvent employed. The temperature must be maintained high enough to keep the polymer in solution.

Another suitable method of chlorination involves dissolving the polymer in a volatile solvent such as carbon tetrachloride at a temperature above the normal boiling point of the solvent and a super atmospheric pressure sufficient to maintain the solvent substantially in a liquid phase, for example, about 80 to 120° C. and 5 to 100 pounds per square inch gauge. A chlorination agent is then added. Usually elemental chlorine is passed through the solution until a partially chlorinated product, normally containing about 15 weight percent combined chlorine is obtained. This intermediate product is soluble in carbon tetrachloride at atmospheric pressure and temperatures up to the boiling point of carbon tetrachloride. The temperature and the pressure can then be lowered, for example, to about 50 to 70° C. and atmospheric pressure, and the chlorination continued to the desired extent. The solvent can be removed by volatilization and the chlorinated polymer recovered as a residue. Alternatively as anti-solvent can be added to precipitate the chlorinated polymer which can then be recovered by filtration.

Methods of halogenation as above set forth are described in greater detail in the copending applications of P. J. Canterino, Serial No. 442,891, filed July 12, 1954, and of P. J. Canterino and J. N. Baptist, Serial No. 446,666, filed July 9, 1954.

It is generally preferred that halogenation be effected in the presence of a catalyst. The reaction zone can be irradiated with sunlight or artificial light. Ultraviolet light is frequently employed. Catalysts include peroxides and hydroperoxides, e.g., benzoyl peroxide, diisopropylbenzene hydroperoxide and cumene hydroperoxide, and azo compounds, particularly those having cyano groups on the carbon atoms alpha to the azo nitrogen atoms, such as dimethyl and diethyl alpha, alpha-azodiisobutyrate; alpha, alpha-azodiisobutyronitrile; and alpha, alpha-azobis (alpha, gamma-dimethylvaleronitrile).

The halogenated polyolefin which can be used to form the coated fabrics of this invention contains an amount of chlorine within the range of about 10 to 60 weight percent chlorine. It is preferred to use chlorinated ethylene polymers having a chlorine content of about 17 to 33 weight percent. Fabrics coated with such polymers have, in addition to excellent water repellency, a high tensile strength and also are flame-retardant. Chlorinated ethylene polymers with a chlorine content above about 25 weight percent are particularly valuable in this latter respect. It can be readily seen that polymers of the desired chlorine content can be prepared by either of the two-step processes and any of the above described methods of preparation are satisfactory. Other methods of chlorination yielding products of this same general type and physical characteristics can also be employed.

The fabric can be treated with the halogenated polymer by any of several methods well known in the art. For example, coatings can be applied by calendering or by hot-pressing a film of the polymer onto the fabric. Extrusion methods are also suitable, such as by passing strips of fabric through a polymer extrusion apparatus equipped with an extrusion coating dye. Also suitable are methods of application, such as dipping, which employ the polymer in the form of a solution when contacted with the fabric. Solvents such as cyclohexane, benzene, toluene, carbon tetrachloride, and the like can be employed to dissolve the halogenated polymer at elevated temperatures, generally about 250° F. being suitable. Fabric can be coated on one side only as shown schematically by Figure 1 where fabric 10 is coated with chlorinated polyethylene layer 11, or both sides or impregnated with the polymer as shown by Figure 2. The amount of chlorinated polyolefin which is applied to the fabric can vary over a wide range but for optimum results is preferably within the range of about 5 to 300 milligrams of halogenated polymer per square inch of fabric. Higher amounts can, of course, be applied if desired; however, the advantages of my invention can be realized with coatings within the above range. Fabrics thus treated exhibit excellent water repellency and in addition retain this water repellency even after exposure to liquid or vaporized aliphatic, cycloaliphatic or aromatic hydrocarbons such as butane, hexane, cyclohexane, benzene, toluene and the like.

To further describe the advantages of my invention and the specific embodiments thereof the following examples are set forth.

*Example I*

Ethylene was polymerized in a sixty gallon reactor in the presence of a chromium oxide catalyst supported by a silica-alumina base. The chromium content of the catalyst was 2.5 weight percent. The catalyst concentration in the reaction mixture was 0.09 weight percent and the polymer concentration in the reactor effluent was 9.0 weight percent. A cyclohexane diluent was used with a feed rate of 200 pounds per hour. Ethylene was fed at 33 pounds per hour with the temperature maintained at 290° F. and the pressure at 420 pounds per square inch gauge. Following separation of catalyst and solvent a polymer having the following characteristics was recovered.

|  |  | ASTM Test Procedure |
|---|---|---|
| Density, grams per cubic centimeter | 0.961 |  |
| Melt Index | 0.485 | D-1238-52T. |
| Tensile Strength, pounds per square inch [1] | 4,170 | D-412-51T. |
| Elongation, percent | 24 | D-412-51T. |
| Softening Temperature, ° F.[2] | 260 |  |
| Crystallinity at 25° C., percent [3] | >90 |  |
| Brittleness Temperature, ° F | <−184 | D-746-55T. |

[1] Compression molded sample, pulled at 20 inches per minute.
[2] Determined as described above.
[3] Determined by nuclear magnetic resonance as described by Wilson and Pake. Journal of Polymer Science, 10, 503 (1953).

The above described polyethylene was chlorinated according to the following procedure. Fifty-five pounds of carbon tetrachloride and 2.1 pounds of polyethylene were charged to a stainless steel reactor. The reactor contents were heated to 225° F. causing the polyethylene to go into solution, and the chlorine was passed into the solution at a temperature of 210° F. for two hours and fifteen minutes. This chlorination was carried out while exposing the solution to the light, of a 4-watt, cool, white fluorescent tube. After chlorination had reached the desired level, the excess chlorine and hydrogen chloride were stripped out of the solution by heating, and the chlorinated polyethylene was precipitated by adding an excess of isopropyl alcohol to the solution. The recovered polymer was then dried in an air oven overnight at 160° F. The chlorine analysis for this polymer was 26.6 weight percent chlorine. This polymer is hereinafter referred to as chlorinated polyethylene A.

Chlorinated polyethylene A was applied to several cotton duck specimens by hot-pressing a film of the chlorinated polyethylene onto the duck. This hot-pressing was carried out by placing the polyethylene film and the duck between two heated plates. Each specimen was seven inches by twelve inches. Two grams of the above described polyethylene was applied to each specimen employing a temperature of 250° F., and a pressure of 30 tons per square inch and a time of 45 seconds. Samples were cut with the weave from these specimens thus coated and tested for tensile strength and percent elongation. The results of these runs are shown in Table I below.

TABLE I

| Sample | Fabric Used | Chlorinated Resin Used | Tensile Strength, p.s.i. | Percent Elongation |
|---|---|---|---|---|
| 1 | Straight weave cut duck. | Chlorinated polyethylene A. | 5,219 | 10 |
| 2 | do | do | 4,091 | 15 |
| 3 | do | None | 4,533 | 20 |
| 4 | do | do | 5,000 | 20 |

As shown by the above data of Table I the tensile strength of cotton duck coated with the treating agent of my invention is not adversely affected and the percent elongation is considerably reduced. These physical properties are thus improved for such applications as tents, awnings, and the like.

*Example II*

A sample of commercial, high pressure-type polyethylene (DYNK) was chlorinated according to the following procedure. Physical properties of this commercial polyethylene are shown below.

|  |  | ASTM Test Procedure |
|---|---|---|
| Density, grams per cubic centimeter | 0.917 |  |
| Melt Index | 0.44 | D-1238-52T. |
| Tensile Strength, pounds per square inch | 1860 | D-412-51T. |
| Elongation, percent | 540 | D-412-51T. |
| Softening Temperature, ° F.[1] | 225 |  |
| Crystallinity at 25° C. percent [1] | <70 |  |
| Brittleness temperature, ° F | <−100 | D-746-55T. |

[1] Same as Example I.

Two-hundred grams of this commercial polyethylene was charged to a five-liter flask, after which 3.5 liters of carbon tetrachloride was charged to the flask. The polymer was dissolved in the carbon tetrachloride by heating the flask contents to 65 to 70° C., after which 150 grams of chlorine was bubbled through the solution. During the addition of chlorine, the solution was exposed to the light of an ultraviolet lamp. The polymer was recovered by pouring the solution into isopropyl alcohol, thus precipitating the chlorinated polyethylene. The precipitated polyethylene was then washed and dried in a vacuum oven at 50° C. for twelve hours. The yield of chlorinated polyethylene was 259 grams, and this polymer had a chlorine content of 25.2 weight percent chlorine. This polymer is hereinafter referred to as chlorinated polyethylene B.

Several seven inch by twelve inch specimens of muslin were each coated with eight grams of chlorinated polyethylene B by the method described in Example I employing a temperature 245° F., a pressure of 30 tons per square inch, and a time of 30 seconds. Additional seven inch by twelve inch specimens of muslin were coated with eight grams of chlorinated polyethylene A described in Example I by the same method and at the same conditions of Example I. The coated specimens of both chlorinated polyethylene A and B were immersed in samples of toluene for 24 hours at about 70° F., after which they were dried and tested for resistance to water penetration.

The test for resistance to water penetration was carried out according to methods 42–52 as given in "Technical Manual and Yearbook of the American Association of Textile Chemists and Colorists," 28, pages 142–143 (1952). According to this test, 500 milliliters of water was allowed to spray from a height of two feet against the top surface of each specimen which was backed by a weighed blotter. The blotter was then immediately reweighed to determine its water adsorption. The water used was held at 80 ±2° F. and the specimens were conditioned at 65 ±2 percent relative humidity at 70 ±2° F. for four hours before the test. Three test specimens were employed for each coated fabric, and the specimens were tested with the warp in the long direction (sample size 7 inches by 12 inches). The results of these runs are shown in Table II.

TABLE II

| Sample | Chlorinated Polyethylene Used | Increase in Weight due to H₂O, Grams |
|---|---|---|
| 1 | Chlorinated Polyethylene A. | 0 |
| 2 | do | 0 |
| 3 | do | 0 |
| 4 | Chlorinated Polyethylene B. | 12.2 |
| 5 | do | 13.3 |
| 6 | do | 12.4 |
| 7 | None | 18.5 |
| 8 | do | 13.6 |
| 9 | do | 16.5 |

It is apparent from the data of the above table that the coated fabrics employing the chlorinated polyethylene having a high degree of crystallinity are far superior to the samples which were coated with the chlorinated polyethylene produced by high pressure methods of polymerization in the retention of water repellency after exposure to hydrocarbons at atmospheric conditions. The above data shows that the fabrics treated according to the process of my invention exhibit excellent water repellency and complete retention of effectiveness even after prolonged exposure to hydrocarbon solvent.

*Example III*

Several specimens of cotton duck were coated with chlorinated polyethylene A or B as described in Examples I and II and immersed in toluene at room temperature (approximately 70° F.) for 24 hours. It was noted that the samples of chlorinated polyethylene B coatings peeled and dissolved while those of chlorinated polyethylene A coatings remained unchanged. Specimens of the same type were immersed in cyclohexane for 24 hours at 70° F. and the coatings of chlorinated polyethylene B peeled and dissolved whereas the fabrics coated with chlorinated polyethylene A remained unchanged. These runs exhibited a truly remarkable superiority of the product of my invention over products of the prior art.

The fabrics coated for water repellency according to my invention exhibit no plasticizer migration, bleeding, extraction or evaporation. These products have improved weather resistance and, as exemplified above, remarkable resistance to hydrocarbon solvents at atmospheric conditions of temperature and pressure. In addition, these products can be readily prepared by a number of coating methods since the chlorinated polyethylene as described herein has a high degree of processability, being capable of extrusion coating and other desirable methods of application.

I claim:

1. An article of manufacture comprising a normally porous fabric and a water-repelling coating having improved resistance to hydrocarbon solvents, said coating comprising a halogenated ethylene polymer having a halogen content of 10 to 60 weight percent halogen selected from the group consisting of chlorine, bromine and iodine, said ethylene polymer being the polymerization product of a monomer system comprising from 85 to 100 weight percent ethylene and from 0 to 15 weight percent monoolefin selected from the group consisting of propylene, 1-butene, and 2-butene and said polymer before halogenation being characterized by a density of at least 0.94, a crystallinity at 25° C. of at least 80 percent and a softening temperature of at least 240° F.

2. A water-repellent fabric having improved retention of water-repellency on exposure to hydrocarbon solvents at atmospheric conditions comprising fabric and a coating thereon of chlorinated polyethylene having a chlorine content of about 17 to 33 weight percent, said polyethylene before chlorination being characterized by a density of at least 0.95, a crystallinity at 25° C. of at least 90 percent and a softening temperature of at least 250° F.

3. An article of manufacture comprising a fabric and a coating thereon of from 5 to 300 milligrams per square inch of chlorinated polyethylene having a chlorine content of about 17 to 33 weight percent, said polyethylene having been prepared by polymerizing ethylene in the presence of a chromium oxide-containing catalyst and being characterized before chlorination by a density of at least 0.95, a crystallinity at 25° C. of at least 90 percent and a softening temperature above 250° F., said coating having improved resistance to hydrocarbon solvents at atmospheric conditions.

4. A method of treating fabric to impart water-repellency thereto which comprises coating the fibers of said fabric with a halogenated ethylene polymer having a halogen content of from 10 to 60 weight percent halogen selected from the group consisting of chlorine, bromine and iodine, said ethylene polymer being a polymerizate of a monomer system comprising from 85 to 100 weight percent ethylene and from 0 to 15 weight percent monoolefin selected from the group consisting of propylene, 1-butene and 2-butene, and said polymer before halogenation being characterized by a density of at least 0.94, a crystallinity at 25° C. of at least 80 percent and a softening temperature of at least 240° F.

5. A method of treating fabric to impart water-repellency thereto which comprises coating the fibers of said fabric with chlorinated polyethylene having a chlorine content of from 17 to 33 weight percent, said polyethylene before chlorination being characterized by a density of at least 0.95, a crystallinity at 25° C. of at least 90 percent, and a softening temperature of at least 250° F.

References Cited in the file of this patent

UNITED STATES PATENTS

| | | |
|---|---|---|
| 2,405,971 | McAlevy | Aug. 20, 1946 |
| 2,592,763 | Taylor | Apr. 15, 1952 |
| 2,785,092 | Hiestand et al. | Mar. 12, 1957 |
| 2,823,142 | Sumner et al. | Feb. 11, 1958 |
| 2,825,721 | Hogan et al. | Mar. 4, 1958 |
| 2,850,490 | Canterino et al. | Sept. 2, 1958 |